UNITED STATES PATENT OFFICE.

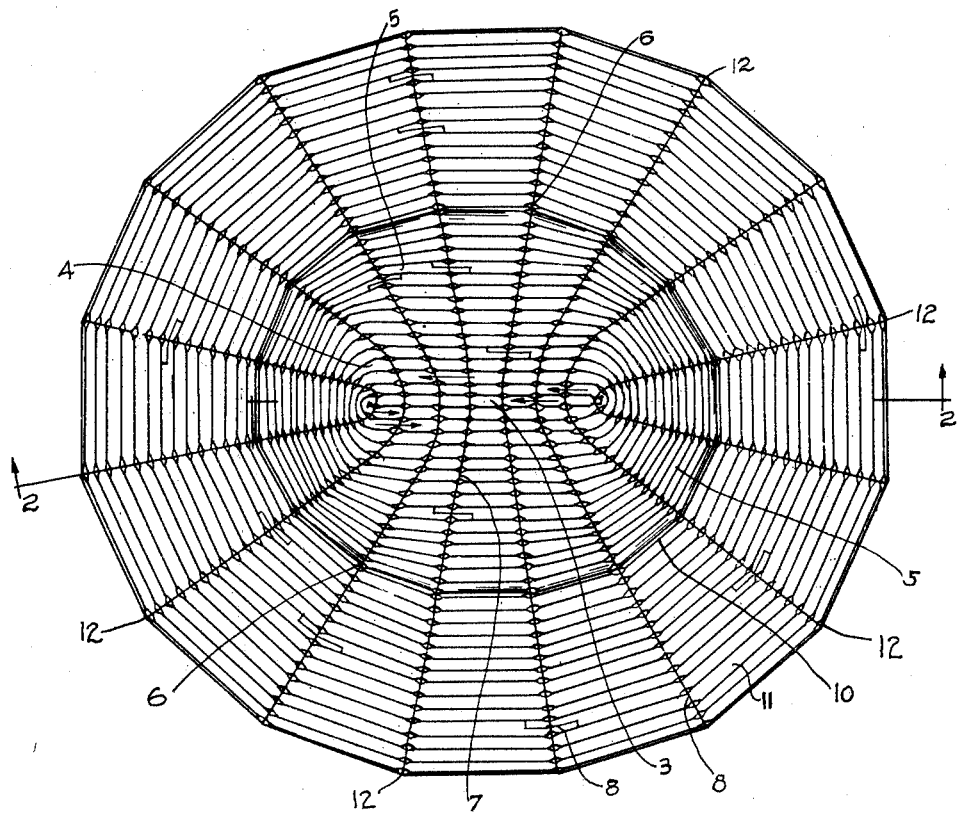

JACOB STEBE, OF CHICAGO, ILLINOIS.

METHOD OF MANUFACTURING STRAW HATS.

1,373,210.  Specification of Letters Patent.  Patented Mar. 29, 1921.

Application filed August 9, 1919. Serial No. 316,324.

*To all whom it may concern:*

Be it known that I, JACOB STEBE, a citizen of Serb-Croat and Slovene State, residing at Chicago, in the county of Cook and State of Illinois, have invented certain new and useful Improvements in and Relating to Methods of Manufacturing Straw Hats, of which the following is a specification.

This invention relates to improvements in straw hats and in a method of manufacturing the same.

An object of the invention is to avoid the necessity of forming the straw into braids, the several members of which are to be held together in pressed form by an adhesive.

It is also an object of the invention to make a straw hat of natural stems of straw by winding these stems into suitable shape and by firmly uniting them in the desired shape.

It is also an object of the invention to combine a plurality of stems of straw by arranging them in longitudinal alinement, and to form a single continuous winding unit by inserting the end of one stem into the adjacent end of the next stem.

It is furthermore an object of the invention to improve the manufacture of hats of this kind by arranging the several turns of straw in a plurality of layers in order to reinforce the several portions of the hat.

With these and other objects in view, an embodiment of the new article of manufacture is illustrated in the accompanying drawing, to which reference is made in the following specification.

In the drawing—

Figure 1 is a top plan view of a straw hat made according to the present method;

Fig. 2 is a sectional view through the same on lines 2—2 of Fig. 1;

Fig. 3 shows, on a slightly enlarged scale, a reinforced portion of the hat in section, and Fig. 4, on a larger scale, shows the union between two longitudinally alined stems of straw in elevation.

The material of which the improved hat is made is straw. While in ordinary straw hats, and particularly in so-called "sailors" a braid is used which consists of a plurality of stems interwoven with each other, pressed into a flat shape, and glued or sewed together, the basic material of the straw hat made in accordance with the improved method is formed by ordinary tubular stems or stalks of straw which are not united into a compressed braid, but which may have been bleached or treated in some other way.

In order to make one continuous length of stems of straw of this kind, they are, during the manufacture of the hat, brought into longitudinal alinement, and one of the two abutting ends of two alined stems 1 is slit longitudinally, preferably at diametrically opposite points. The slit 2 must not necessarily extend a long distance inwardly and longitudinally from the end. The two ends are then telescoped into each other, as shown in Fig. 4, where it will be seen that the upper half of the end of the slitted stem 1 overlies the end of the other stem, while the lower half of the slitted end of the stem 1 is inserted into the other stem. Owing to the provision of the slit 2 in one end of the stems, this insertion of one stem into the other is greatly facilitated and avoids the necessity of selecting, for proper alinement and insertion, two stems one of which would have a smaller diameter at its end than the other stem. No matter which end may have a larger diameter, it will also be possible to combine the two ends in the form described after a slit has been made in one of these ends.

It is also obvious that a unit for building up a straw hat from stems may be made by placing two or more of these stems alongside of each other and uniting other similarly arranged stems by slits and telescopic insertion with the first mentioned stems.

A tubular stem of straw of sufficient length having been selected, a portion of this stem or unit is left straight, as indicated at 3 in Fig. 1, and the balance of this unit is then wound about the straight portion 3 until a number of spirallic turns, all preferably located in a single horizontal plane, is made. The spirallic turns, as will be understood by reference to Fig. 1, are not circular spirals, but comprise windings of relatively narrow elliptic form. Gradually, however, this elliptic shape is widened, as, for instance, indicated at the portion 4 in Fig. 1, and the relatively wider spirallic elliptic turns gradually merge into spirallic polygonal turns 5, which also are in the same horizontal plane, until a top of a crown has been made which has the desired hat size. The polygonal figure defined by these windings, as shown in the drawing, is a regular symmetrical polygon with sixteen corners 6.

In order to maintain the elliptic and polygonal spirallic windings in the desired relation and closely adjacent to each other, they are united by threads, not in the form of stitches, but preferably in the form of loops 7, which are tied about these tubular stems, and which may be knotted in the narrow interspace between adjacent stems at 8. From Fig. 1 it will also be seen that these loops are in alinement and are arranged on radial lines which extend from a number of points in the inner spirallic windings to the corners 6 of the polygonal figure.

After this desired size of the top of the crown has been reached, the winding of the straws is continued by a number of helical turns 9 until the crown, indicated as a whole by the reference character 10, has reached the desired height. The circumference of the crown preferably has a contour corresponding to that of the top of the crown, although this is not absolutely essential, and the hat may be given any desired shape after the winding has been completed, by pressing or in some other suitable way. It will also be noted that the alinement of the loops 7 and the knots associated therewith is continued over the entire height of the crown, these loops and knots being in alinement in the helical turns of the stems of straw of which the crown is built up.

After a certain height of the crown has been made, the brim 11 of the hat is built up of spirallic turns into which the several stems of straw are wound, preferably again in a horizontal plane, and the line of loops 7 again is continued to appear in alinement with the series of loops and knots extending over the top and the sides of the crown, as may be clearly seen from Fig. 1. Where it is desired to provide the hat with a very wide brim, a large number of these turns in spiral form is made, while with a relatively narrower brim a smaller number of these turns only is necessary.

From Figs. 2 and 3 it will be noted that the brim portion 11 of the hat is reinforced by combining several layers of these spirallic turns, which layers may be united by binding, at intervals, the turns of one layer together with the turns of the other layer. It will also be noted that the contour of the brim corresponds to the contour of the top of the crown, presenting, in top plan view in the embodiment illustrated, a regular polygon with sixteen corners. The alinement of the loops and knots in the brim is continued from the corners of the top and from the corners of the prismatic sides of the crown to the corners 12 of the brim.

The length of the several stems 1 of which the windings, spirallic as well as helical, are built up, is selected so that the end portions of two alined stems are held together in their telescoping arrangement by the loops 7 of the threads which are used for holding the entire structure together. These abutting end portions, therefore, are not located in any one of the many windings or turns between two loops of the same turn, but are always surrounded by the strands of a loop, so that these loops not only serve for holding the several turns in the arrangement desired, but they also serve for holding the several stems which may compose one turn, or which may extend over several turns in proper longitudinal alinement.

After a structure of the described kind has been completed, a definite rigid shape may be imparted to the same, if necessary, by pressing or in some other suitable way.

I claim:

In a method of making straw hats, the steps of making winding units by bringing stems of straw into alinement, partly inserting the end of one straw into the adjacent end of another straw to form a continuous winding unit, winding said units in spirallic turns, tying adjacent turns together, and tying adjacent stems together.

In witness whereof, I have hereunto subscribed my name this 2nd day of August 1919.

JACOB STEBE.